May 9, 1933. C. F. M. VAN BERKEL 1,907,620
MACHINE FOR SLICING MEAT CONTAINING BONES
Filed Oct. 28, 1927

Inventor
Cornelis F. M. van Berkel
By Nissen & Crane
Attys.

Patented May 9, 1933

1,907,620

UNITED STATES PATENT OFFICE

CORNELIS FRANCISCUS MARIA VAN BERKEL, OF WASSENAAR, NETHERLANDS, ASSIGNOR TO U. S. SLICING MACHINE COMPANY, OF LA PORTE, INDIANA, A CORPORATION OF INDIANA

MACHINE FOR SLICING MEAT CONTAINING BONES

Application filed October 28, 1927, Serial No. 229,340, and in the Netherlands November 5, 1926.

This invention relates to a machine for slicing meat and is particularly adapted for slicing chops or other meat having bones therein.

The object of the present invention is the provision of a machine of the class named which shall be of improved construction and operation and in which a circular slicing machine knife is given bodily movement for chopping the bone and also a rotary movement for slicing the meat. Other objects and advantages will appear from the following description.

The invention is exemplified in the combination and arrangement of parts shown in the accompanying drawing and described in the following specification, and it is more particularly pointed out in the appended claims.

In the drawing:—

Figure 1:
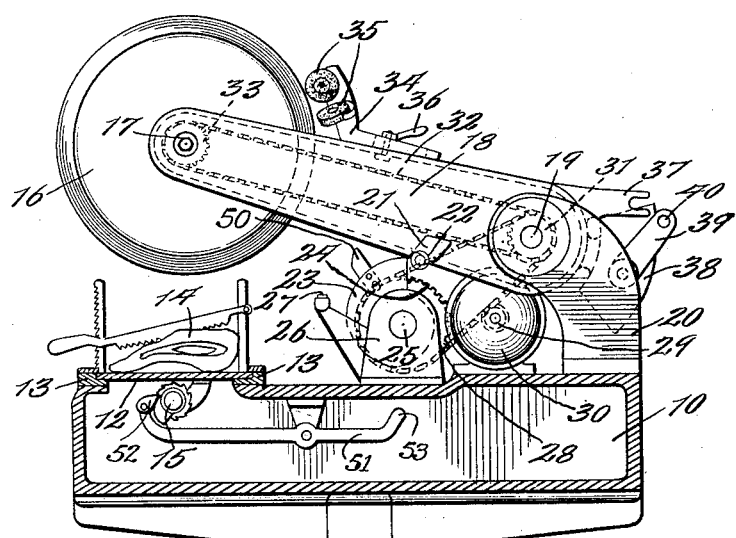
Fig. 1 is an elevation with parts in section showing one embodiment of the present invention.

The slicing machine base 10 may be placed upon a pedestal 11 or other suitable support and is provided with a meat plate 12 mounted to slide on guideways 13 to carry the meat 14 to be sliced toward the cutting plane of the slicing knife. Any suitable feeding mechanism 15 may be provided for feeding the table 12 toward the knife. The knife 16 is journaled at 17 on the end of a supporting arm 18 in the form of an elongated housing. The arm 18 is pivotally mounted at 19 on the bracket 20 supported by the base 10. A lug 21 is secured to the arm 18 and carries a roller 22 which travels on a cam 23. The cam 23 is driven by a sprocket wheel 24 mounted on a shaft 25 journaled in a bracket 26 on the base 10. The cam rotates in a counter-clockwise direction, as viewed in Fig. 1, and is provided with a spiral cam face terminating in an offset shoulder so that rotation of the cam gradually lifts the arm 18 to its uppermost position whereupon it is permitted to drop suddenly, bringing the knife 16 across the piece of meat 14 to be sliced. A cushion stop 27 arrests the downward movement of the arm 18 to prevent injury to the cam roller 22. The cam 23 carries a projection 50 which engages the end 53 of a pivoted lever 51 for periodically rocking said lever about its pivot. The arm 51 carries a pawl 52 which actuates the feeding mechanism 15 to advance the feed table 12 so that successive slices may be cut.

The sprocket wheel 24 is driven by a chain 28 which engages a sprocket wheel 29 on a motor 30. The motor 30 is mounted on the base 10. The chain 28 also travels over a double sprocket wheel 31 loosely mounted on the shaft 19. A chain 32 is disposed within the arm 18 and is driven by the double sprocket wheel 31 and operates a sprocket wheel 33 which rotates the knife 16. This imparts a rotary slicing movement to the knife 16 in addition to the downward chopping movement imparted to the knife by gravity.

A bracket 34 is slidably mounted on the arm 32 and carries grinding stones 35 for sharpening the knife 16. The bracket 34 may be clamped in either an operative or an inoperative position by a hand clamp 36. The arm 18 is provided with a bifurcated extension 37 and a counterweight 38. A pivoted link 39 carries a pin 40 which may be swung into the opening in the extension 37 to hold the arm 18 in its uppermost position. This will permit the knife 16 to be rotated without vertical movement being imparted thereto by the cam 23. This rotation of the knife about a stationary axis is for the purpose of permitting sharpening or cleaning of the knife.

Figure 2:
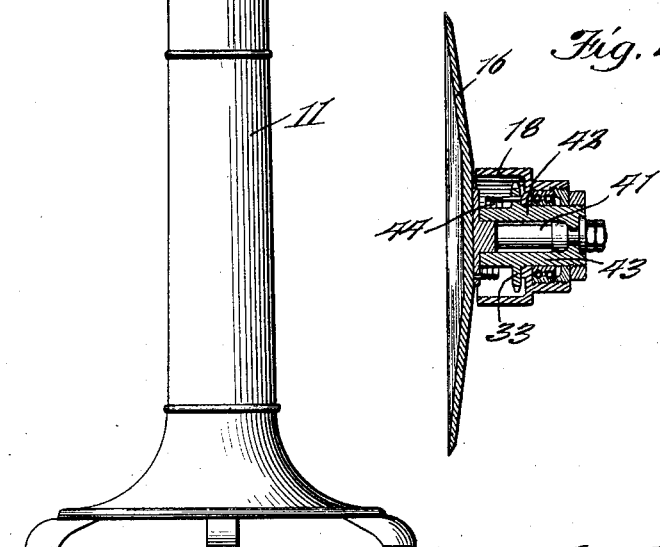
Fig. 2 is a sectional view showing a knife mounting having a spring drive.

When the knife is moved into contact with a piece of bone, the bone tends to grip the knife and prevent rotation thereof. In some instances, it is desirable to permit the rotation of the knife to be discontinued until the bodily movement of the knife has severed the bone. This may be accomplished by the arrangement shown in Fig. 2 in which the knife 16 is mounted on a spindle 41 journaled in a sleeve 42. The sleeve 42 is in turn journaled in the end of the arm 18 by means of roller bearings 43. The sprocket 33 is mounted on the sleeve 42 and the sleeve and knife are yieldingly connected by a helical spring 44 having one end connected to the knife and the other end connected to the sprocket 33. Where this arragement is used, the knife will be permitted to stop rotation temporarily when it strikes a piece of bone and the sprocket 33 will continue to rotate, placing the spring 44 under stress. As soon as the bone is severed, the spring 44 will accelerate the rotation of the knife, insuring a smooth cutting movement of the knife upon the meat.

I claim:—

1. A slicing machine comprising an arm having a knife journaled thereon, said arm being pivoted to move vertically, and means for raising said arm and permitting it to fall under the force of gravity to bring said knife into contact with meat to be sliced.

2. A slicing machine comprising a knife support, a circular knife journaled on said support, and a cam for raising said knife, said cam having an offset shoulder thereon for permitting said knife to fall under the force of gravity into contact with a piece of meat to be sliced.

3. A slicing machine comprising a meat support, a pivotally mounted knife supporting arm, a circular knife journaled on said arm, a cam for raising said knife, said cam having an offset portion therein for permitting said knife to fall under the force of gravity into contact with a piece of meat to be sliced, and means for rotating said knife about the axis thereof.

4. A machine for slicing meat and bone comprising a knife support, means for raising said support and knife and permitting said support and knife to fall under the force of gravity to cause said knife to sever slices from a piece of meat on said knife support, means for rotating said knife about its axis, and means for retaining said knife support in fixed position during rotation of said knife for sharpening or cleaning said knife.

5. A machine for slicing meat and bone comprising a meat support, a pivotally mounted arm, a circular slicing knife journaled on said arm, means for raising said arm and for permitting said arm and knife to drop under the force of gravity, means for rotating said knife, and a spring connection between said knife and rotating means.

6. A slicing machine comprising a rotary slicing knife, a cam for raising said knife, said cam having an offset shoulder therein to permit said knife to be dropped by gravity, and a cushion stop for arresting the downward movement of said knife.

7. A slicing machine comprising a rotary circular slicing knife, a pivoted arm for supporting said knife, driving mechanism for rotating said knife, a coil spring for transmitting movement from said driving mechanism to said knife, and a motor for operating said driving mechanism.

8. A slicing machine comprising a meat support, a rotary slicing knife, a pivoted arm for supporting said knife, a cam for raising said arm, said cam having an offset therein to permit said knife to drop by gravity into engagement with heat on said meat support, a drive for rotating said knife, a spring interposed in said drive, and a motor for operating said cam and drive.

9. A slicing machine comprising a rotating knife driving mechanism for said knife, a vertically movable arm, and means connecting said driving mechanism with said arm to raise said arm, said means releasing said arm when raised to permit it to fall.

10. A slicing machine comprising an arm having a knife journaled thereon and mounted for vertical movement, and means for raising said arm and thereafter permitting it to fall under the force of gravity to bring said knife into contact with the substance to be sliced.

11. A slicing machine comprising a substance support, a vertically movable member, a knife mounted upon said member, a cam for raising said member, said cam having an offset portion therein which permits the knife to drop under the force of gravity into engagement with the substance on the substance support after the member has been raised by the cam, means for rotating the knife, a spring interposed in said drive, and a motor for operating said cam and drive.

12. A slicing machine comprising a vertically movable arm, a rotating knife mounted upon said arm, a rotating cam adapted to co-operate with means on the arm to raise said arm and having an offset portion which permits said arm to be dropped under the force of gravity after the arm has been raised.

13. A slicing machine comprising a pivoted arm, a knife rotatably mounted upon said arm, a rotating cam for raising said arm and thereafter permitting said arm to drop under the force of gravity, a substance support upon which the substance to be sliced is placed, a feeding means for said support adapted to move said support in a step by step movement toward the cutting plane of said knife, and means on said cam adapted to actuate said feeding means.

14. A slicing machine comprising a pivoted arm, a rotating knife on said arm, a work support, and a feeding means for feeding said work support toward the slicing knife, a pivoted lever having operative connection with said feeding means for actuating the same as said lever is rocked about its pivot, a cam rotatably mounted upon a fixed support and adapted to co-operate with means on said arm to raise said arm and to thereafter permit said arm to drop under the force of gravity, and a projection on said cam adapted to contact with said pivoted lever to rock said lever and thereby actuate said feeding means.

15. A slicing machine comprising an arm mounted for vertical movement, a rotary circular slicing knife carried by said arm, and driving mechanism for rotating said knife, said driving mechanism including a connection for permitting relative movement between said knife and its driving mechanism when a force is exerted on said slicing knife to retard its normal rotative movement, and means for raising said knife to a position above and out of contact with the substance to be sliced, said means being rendered inoperative to hold said knife in a raised position after the same has been raised into that position whereby said knife can move rapidly under the force of gravity against the substance to be sliced.

16. In a slicing machine, the combination with a rotary circular slicing knife, of power means for driving said knife, means for moving said knife upwardly and thereafter permitting said knife to descend under the force of gravity into engagement with the substance to be sliced, and a connection between said driving means and said knife operative to permit retardation of said knife's normal rotative movement as the knife moves into engagement with the substance without interrupting the driving connection from said power means to said knife.

In testimony whereof I have signed my name to this specification on this eleventh day of October A. D. 1927.

CORNELIS FRANCISCUS MARIA van BERKEL.